Feb. 27, 1962 C. B. MYERS ET AL 3,022,929
APPARATUS FOR MOVING SLENDER ELONGATED MEMBERS LENGTHWISE
Filed March 17, 1959 2 Sheets-Sheet 1

INVENTORS
WILLIAM W. COFFEEN
CURTIS B. MYERS
BY Robert J. Path
ATTORNEY

Feb. 27, 1962 C. B. MYERS ET AL 3,022,929
APPARATUS FOR MOVING SLENDER ELONGATED MEMBERS LENGTHWISE
Filed March 17, 1959 2 Sheets-Sheet 2

INVENTORS
WILLIAM W. COFFEEN
CURTIS B. MYERS
BY Robert J Patch
ATTORNEY

United States Patent Office 3,022,929
Patented Feb. 27, 1962

3,022,929
APPARATUS FOR MOVING SLENDER ELONGATED MEMBERS LENGTHWISE
Curtis B. Myers, Short Hills, and William W. Coffeen, Westfield, N.J., assignors to Metal & Thermit Corporation, Woodbridge Township, N.J., a corporation of New Jersey
Filed Mar. 17, 1959, Ser. No. 799,935
12 Claims. (Cl. 226—184)

The present invention relates to apparatus for moving slender elongated members lengthwise, and more particularly to such apparatus adapted to impart continuous lengthwise movement to the members.

The invention has utility in a number of fields, such as the feeding of wire to wire straighteners and heading machines, the feeding of wire to reels and the withdrawal of wire from reels, moving rods or wire through plating or wire drawing operations, the feeding of welding wires or electrodes to a weld area, and the moving of wire through welding wire or electrode manufacturing operations, among many others.

Moreover, the invention has utility in connection with slender elongated members of a variety of configurations. Thus, although it is preferred that the cross sectional contour of the member to be moved be circular, a variety of other shapes such as oval, square, rectangular or other polygonal shapes can be moved. Furthermore, although the invention has as its preferred field of application the moving of members of indeterminate length such as wire fed to or removed from reels, it also has utility in the moving of slender elongated members of determinate length such as flexible or rigid rods, bars and tubes.

Finally, the present invention has utility for moving slender elongated members both by pulling, as in wire drawing operations, and by pushing, as in semiautomatic welding operations in which a welding wire is pushed through a flexible conduit to a gun.

Accordingly, it is an object of the present invention to provide apparatus for moving a slender elongated member lengthwise, characterized in that the member does not become misshapen during such movement.

Another object of the invention is the provision of such apparatus adapted to move slender elongated members of a variety of sizes without the substitution of any of the parts of the apparatus, and more particularly the provision of such apparatus that is automatically self-adjusting to any of a variety of sizes of members to be moved and also to members of which the cross-sectional configuration varies lengthwise of the member.

Finally, it is an object of this invention to provide such apparatus that will be relatively inexpensive to manufacture, easy to operate, maintain and repair, and rugged and durable in use.

Other objects and features of the present invention will become apparent from a consideration of the following description, taken in connection with the accompanying drawings, in which.

Figure 1:
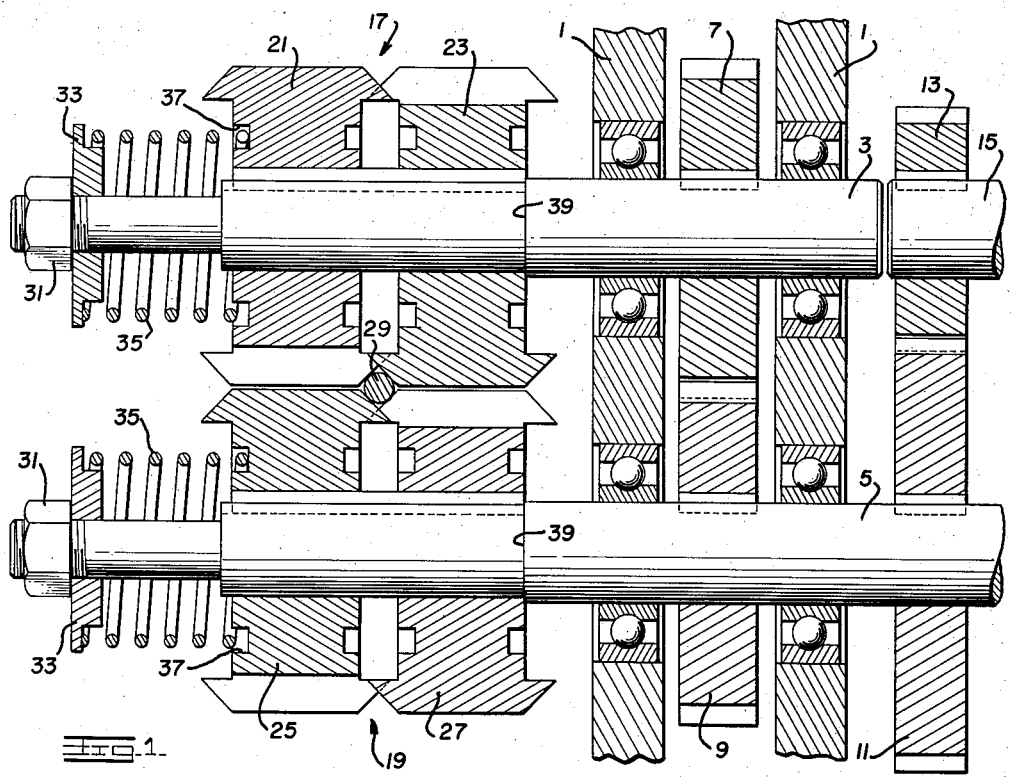
FIGURE 1 is a cross sectional view of apparatus according to the present invention.

Referring now to the drawings in greater detail, there is shown a fixed base 1 having journalled for rotation therein a pair of shafts 3 and 5 which are rotatable about spaced parallel axes. Keyed to shaft 3 is a gear 7 and keyed to shaft 5 is an identical gear 9. Gears 7 and 9 are in mesh with each other to assure conjoint rotation of shafts 3 and 5 in opposite directions at equal angular velocities. Keyed to one end of shaft 5 is a driven gear 11 in mesh with a drive pinion 13 keyed to one end of a drive shaft 15 adapted to be drivingly rotated by a power source (not shown).

Also mounted on shafts 3 and 5 is a pair of opposed roll means comprising opposed roll sets 17 and 19. Roll set 17 comprises a first roll 21 and a second roll 23 mounted coaxially on shaft 3 and spline coupled to shaft 3 for rotation therewith and for axial sliding movement relative thereto and relative to each other. Roll set 19 comprises a third roll 25 and a fourth roll 27 mounted coaxially on shaft 5 and spline coupled to shaft 5 for rotation therewith and for axial sliding movement relative thereto and relative to each other.

First and third rolls 21 and 25 are directly opposed to each other, as are also second and fourth rolls 23 and 27. First and fourth rolls 21 and 27 are diagonally opposed to each other, as are also second and third rolls 23 and 25. The closest approach of the four rolls to each other thus provides a roll bite in which is received a slender elongated member such as wire 29, which is in contact with all four rolls during operation of the device, though not necessarily simultaneously.

At the end of each of shafts 3 and 5 adjacent the associated roll set is a nut 31 received on a screw threaded end of the shaft and providing adjustable backing for a thrust ring 33. A coil compression spring 35 encircles the end of each shaft and acts between ring 33 and the adjacent roll of the associated roll set. For this purpose, each roll is provided on each side thereof with an annular coaxial groove 37 in which one end of spring 35 seats. Springs 35 are in compression in the assembled relationship shown in FIGURE 1 and thus continuously yieldably urge the adjacent rolls toward the farther rolls of the roll sets, and also act through the adjacent rolls and the member 29 to urge the farther rolls to the right as seen in FIGURE 1 against annular shoulders 39 provided on shafts 3 and 5.

Figures 2, 3:
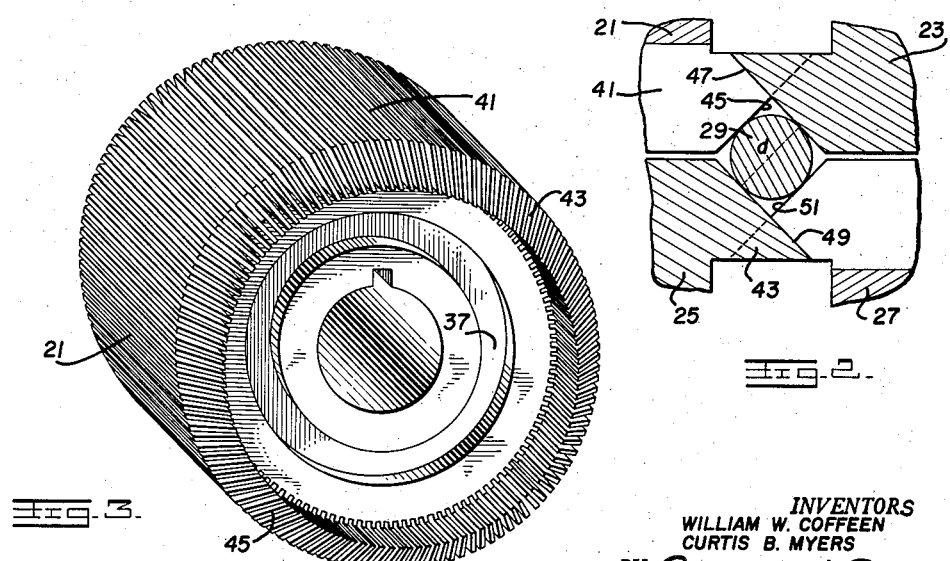
FIGURE 2 is an enlarged fragment of FIGURE 1, more clearly showing certain relationships between rolls according to one embodiment of the present invention and an elongated member to be moved thereby.
FIGURE 3 is an enlarged perspective view of one of the rolls shown in FIGURE 1.

In the embodiments of FIGURES 1, 2 and 3, all four rolls are identical. Therefore, a description of one serves for all. Also, each roll is bisymmetric about that midplane which is perpendicular to its axis; and hence a description of one end of the roll serves as a description of the other end as well.

Each roll has a multiplicity of radially extending ribs 41 which are disposed lengthwise thereof parallel to the axis of the roll and are equidistantly spaced apart by slots of a width slightly greater than the width of the ribs. The side edges of the ribs lie in planes which include the axis of the roll. The ribs 41 terminate endwise in circumferentially equidistantly spaced axially extending projections comprising ends 43 of which the side edges are continuations of the side edges of the ribs. It is ends 43, and not ribs 41 as a whole, that are of the essence of the present invention; and hence the following description and discussion will be concerned with the configuration and functions of ends 43. Ribs 41 serve no purpose in the present invention other than to provide supports for ends 43; and ribs 41 are of their particular configuration as a whole simply for ease of machining, so as more readily to provide accurately formed and located ends 43. Ends 43 of the rolls of each roll set interfinger with each other, the ends 43 of one roll sliding between the adjacent ends 43 of the other roll of each set. To avoid interference with the roll proper, the depth of the slots between ribs 41 is made somewhat greater than the radial depth of overhanging ends 43.

The rolls of each roll set have portions defining peripheral tapered surfaces oppositely inclined radially inwardly toward each other. For this purpose, in the embodiment illustrated in FIGURES 1, 2 and 3, the ends 43 of rolls 21, 23, 25 and 27 have endwise radially inwardly inclined outer surfaces 45, 47, 49 and 51, respectively. These surfaces all form angles of 45° with the axes of the rolls and comprise at least a portion of the tapered surfaces referred to above and a portion of the periphery of the rolls. Thus, at the roll bite, surfaces 45 and 51 are parallel to each other and surfaces 47 and 49 are parallel to each other, while surfaces 45 and 47 are perpendicular to each other and surfaces 49 and 51 are perpendicular to each other in this first embodiment.

The ends 43 of all four rolls are spaced apart equal angular distances; and as the adjacent ends of the rolls of each roll set interfinger, the inclined surfaces forming at least a portion of the oppositely inclined tapered surfaces are staggered about the rolls of each roll set in alternate relationship. Thus, when an end 43 of a roll is disposed in the plane of the parallel axes of shafts 3 and 5 and between those axes, no end 43 of the other roll of that roll set will be disposed in the plane of and between those axes. However, a very important feature of the present invention resides in the fact that the rolls are so mounted on their shafts and so oriented relative to each other that when an end 43 of one roll is disposed in the plane of and between those parallel axes, an end 43 of the diagonally opposite roll will also be disposed in the plane of and between those parallel axes. Thus, as illustrated in FIGURES 1 and 2, when an end 43 of roll 23 is disposed exactly in the roll bite, that is, in the plane of and between the parallel axes of the shafts, an end 43 of roll 25 is also disposed exactly in the roll bite. With a slight turning movement of the parts from their position shown in FIGURES 1 and 2, an end 43 of roll 21 will be disposed exactly in the roll bite and and at the same time an end 43 of roll 27 will be disposed exactly in the roll bite; but in this latter position no end 43 of either of rolls 23 and 25 will be disposed exactly in the roll bite.

In the case of a member 29 of circular cross section, as seen in FIGURE 2, there is thus provided first means for grasping the member at a pair of first points on opposite ends of a first diameter $d$ of the circular cross section and for applying lengthwise to the member a force at those first points to move the member lengthwise a distance in one direction. As seen in FIGURE 2, those first means comprise diagonally opposed ends 43 of rollers 23 and 25. Of course, the "points" are actually very short lines of a length equal to the thickness of ends 43 at the point of contact; but since the result of this contact is the same as actual point contact, those very short lines are aptly referred to herein as "points." The diagonally opposed ends 43 of rolls 21 and 27 provide second means for subsequently grasping the member at a pair of second points on opposite ends of a second diameter of the circular cross section and for applying lengthwise to the member a force at those second points to move the member lengthwise a further distance in that same direction. In the case of such first and second means which are not comprised by immediately adjacent ends 43, those first and second diameters are clearly spaced apart lengthwise of the member. In the case of immediately adjacent ends 43, in which the very short lines of contact extend one from the end of the other lengthwise of the member though spaced apart peripherally of the member, the mean or average first and second diameters are spaced apart lengthwise of the member half the pitch of ends 43 at the points of contact. In any event, the first and second diameters are disposed at substantial angles to each other, and are perpendicular to each other in this first embodiment. Upon continued operation of the device, those first and second means are continuously alternately actuated upon rotation of the rolls thereby continuously to move the member lengthwise in that same direction.

More specifically, ends 43 include a pair of first elements rotatable in spaced parallel circular orbits in opposite directions about spaced parallel axes and adapted to grasp the member between them at a pair of first points on opposite ends of a first diameter of the circular cross section, and also comprise a pair of second elements spaced from the first elements and rotatable in spaced parallel circular orbits in opposite directions about the same spaced parallel axes as the first elements and adapted to grasp the member between them at a pair of second points on opposite ends of a second diameter of the circular cross section, the first and second diameters being spaced apart lengthwise of the member and being disposed at a substantial angle to each other and the first and second elements being alternately actuated to move the member lengthwise continuously in that same direction.

In the embodiment of FIGURES 1, 2 and 3, the tapered surfaces are all at an angle of 45°, so that the member 29 is grasped between diagonally opposed parallel surfaces and the points of contact are obviously all at equal distances from the axis of rotation of the associated roll. Any tendency of member 29 to crowd more deeply between the rolls of one roll set them between the rolls of the other roll set would cause the points of contact between the member and one roll set to be spaced from the axis of rotation of that roll set a different distance than the points of contact of the member with the other roll set are spaced from the axis of rotation of that other roll set. The result would be that the points of contact of one roll set would have a tangential velocity parallel to the member different from the velocity of the member itself; and since this unbalanced condition would consume energy and require the performance of extra work, the device automatically will seek that position of the parts relative to each other such that the least work is consumed, namely, the position in which member 29 is exactly centered in the roll bite. Thus, in addition to being automatically self adjusting to the size of member 29, the device is also automatically self adjusting to center member 29 in the roll bite thereby to assure equal velocities of member 29 and of all teeth 43 axially of member 29.

It might at first appear that the equal velocities of member 29 and teeth 43 axially of member 29 as described above could be achieved only if the angles of inclination of the tapered surfaces were all equal to each other, or even that this desired relationship could be achieved only if the angles of the tapered surfaces were all 45°. Such however, is not the case, as will now be demonstrated in connection with FIGURE 4.

Figure 4:
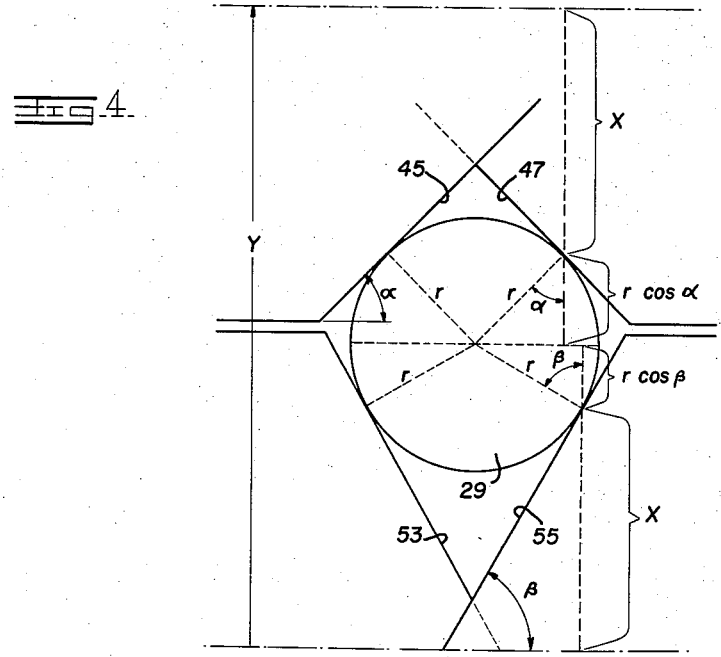
FIGURE 4 is a diagrammatic view showing somewhat graphically certain relationships of another embodiment of the present invention.

In FIGURE 4, there is diagrammatically represented a roll bite in which the angles of the tapered surfaces of both rolls of one roll set are all equal to each other and in which the angles of inclination of the tapered surfaces of both rolls of the other roll set are all equal to each other, but in which the angles of one roll set are distinctively different from the angles of the other roll set. Thus, the upper roll set of FIGURE 4 is the same as the upper roll set of the first embodiment and the inclined outer surfaces 45 and 47 are all at 45° to their associated axis of rotation. However, the other or lower roll set of FIGURE 4 has inclined outer surfaces 53 and 55 which are disposed all at angles of 60° to their associated axis of rotation. Granted that such a pair of opposed roll means can be designed to accommodate a member 29 of one particular diameter so that the contact points are all equal distances from their respective axes of rotation, the question is whether the same roll sets will have any operative position in which they can contact a member 29 of a distinctively different size while still maintaining the distances of the contact points from their respective axes of rotation all equal to each other.

In FIGURE 4, the distance between the axes of rotation is $y$ and remains constant. The radius of member 29 is $r$ and varies. The distance from an axis of rotation to a contact point is $x$ and must be the same for all contact points about those axes of rotation for a given value of $r$. The angle of inclination of the inclined surfaces of the upper roll set is $\alpha$ and is 45°, while the angle of inclination of the inclined surfaces of the lower roll set is $\beta$ and is 60°. As is seen from FIGURE 4, the relationship of these values to each other is expressed by the equation.

$$y = 2x + r(\cos \alpha + \cos \beta)$$

Of course, the value of $\cos \alpha$ is 0.707 and that of $\cos \beta$ is 0.5. One can assign the arbitrary value of 20 cm. to $y$ and this of course will remain fixed in accordance with the fact that the spacing between shafts 3 and 5 does not change despite a change in size of member 29. If a first value for $r$ is taken to be 2 cm., the value of $r \cos \alpha$ is 1.414 cm. and that of $r \cos \beta$ 1.000 cm. Substituting in the above equation, the value of $x$ is found to be 8.768 cm.

Choosing now a different value for $r$ of 4 cm., as would be represented by doubling the size of member 29, it is seen that $r \cos \alpha$ doubles to 2.828 and $r \cos \beta$ doubles to 2.000, while the value of $x$ drops to 7.586 cm. Of course, what is true for these two sample calculations based on two distinctively different sizes of member 29 is true for all sizes of member 29 which can be accommodated in the roll bite; and hence, it follows that there will be positive values for $x$, for $r \cos \alpha$ and for $r \cos \beta$ for all such sizes of members 29. The significance of this fact, of course, is that it leads to the geometrically demonstrable conclusion that if the angles of inclination of one roll set are equal to each other and the angles of inclination of the other roll set are equal to each other but distinctively different from those of the one roll set, all sizes of member 29 can still be accommodated with the tangential speeds of the contact points on all rolls all equal to each other.

Naturally, the roll set having the lesser angle of inclination tends to exert a stronger welding action against member 29 tending to drive the member more deeply into the roll set of greater inclination, but this tendency can be overcome by the use of springs 35 exerting compressive forces related to each other as the cosines of the respective angles of the inclination. Needless to say, however, the embodiment of FIGURES 1, 2 and 3 is preferable to that of FIGURE 4 as the former embodiment is simpler and offers greater opportunities for interchangeability of parts. Also, the embodiment of FIGURE 4 does not provide diagonally opposed parallel contact surfaces and hence does not provide for grasping the member 29 at the ends of diameters in the case of a circular member 29, as described above.

Figure 5:
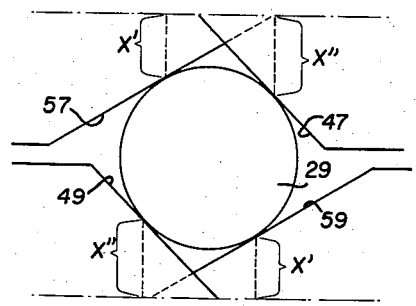
FIGURE 5 is a view similar to FIGURE 4 but showing another embodiment of the present invention.

In FIGURE 5, a still further embodiment is indicated, having the same diagonally opposed second and third rolls as the first embodiment, with inclined surfaces 47 and 49 disposed at 45° angles and parallel to each other. However, the first and fourth diagonally opposed rolls have parallel inclined surfaces 57 and 59 which are disposed at angles of 30° to their respective axes of rotation.

The distances of the contact points from the axes of rotation are indicated by $x'$ and $x''$ in FIGURE 5. As is seen there, the distance to the axes of rotation from the contact points of surfaces 57 and 59 is $x'$ while the distance from the contact points of the other two surfaces 47 and 49 is $x''$, and $x''$ is always greater than $x'$. Hence, it will be seen from FIGURE 5 that an arrangement in which diagonally opposed rollers are similar but the rolls of a given roll set are different as to the angularity of their contact surfaces produces a device which will have the advantage of grasping the member to be moved at the ends of diameters of its cross section but has the disadvantage of unequal peripheral contact speeds by virtue of different contact radii relative to the axes of rotation.

Hence, the first embodiment, of FIGURES 1, 2 and 3, characterized by all four rolls being identical, has the advantages that it provides for equal peripheral contact speeds and also provides for grasping the member to be moved at the ends of diameters of its cross section. The embodiment of FIGURE 4 has the advantage that it provides for equal contact speeds but has the disadvantage that it does not grasp the member at ends of diameters. The embodiment of FIGURE 5 has the advantage that it grasps the member at ends of diameters, but does not provide for equal peripheral contact speeds. Still another embodiment could be postulated in which the rolls of each roll set would be not only different from each other but also different from their diagonally opposed rolls with regard to angularity of the inclined peripheral contact surfaces. Such an arrangement would be the least preferred of all embodiments, as it would not provide for equal contact speeds, would not grasp the member at the ends of diameters, and would offer no oportunity for interchangeability of parts.

Figure 6:
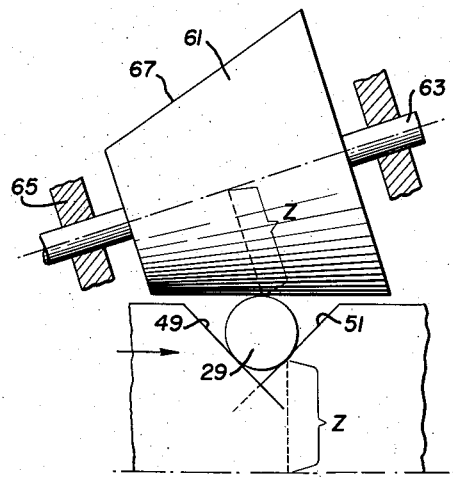
FIGURE 6 is a view similar to FIGURES 4 and 5 but showing a still further embodiment of the present invention.

Yet another embodiment is disclosed in FIGURE 6. As there shown, the lower roll means comprises a roll set identical with the lower roll set of the embodiment of FIGURES 1, 2 and 3; but the upper roll means is comprised by a tapered roll 61 rotatable about a shaft 63 journalled in a fixed base 65. The axis of rotation about shaft 63 is inclined at an acute angle to the axis of rotation of the lower roll set and roll 61 has a conical surface 67 of such a taper that the contact radius $z$ of the lower roll set remains the same as the contact radius $z$ of the upper roll means for all sizes of members 29. Thus, for example, if the member 29 as shown in FIGURE 6 is replaced by a smaller member 29, the lefthand roll of the lower roll set will move in the direction of the arrow in FIGURE 6 and the contact point will move up the incline of surface 51, thereby to increase the contact radius of the lower roll set. At the same time, however, the contact point with the upper roll means will move to the right along conical surface 67 increasing the radius of contact with roll 61 and the angle of the axes of rotation relative to each other and the taper of conical surface 67 are so chosen that the contact radii will remain equal to each other for all sizes of members 29. The upper and lower roll means are driven conjointly at equal angular velocities in opposite directions, for example by bevel gearing interconnecting the two roll means.

From a consideration of the foregoing disclosure, it will be obvious that all of the initially recited objects of the present invention have been achieved. In addition, a number of further advantages of the present invention will suggest themselves to those skilled in this art. For example, it will be apparent that a plurality of roll sets may be disposed on a single shaft or for rotation about a common axis so as to permit the conjoint movement at precisely equal speeds of a plurality of members 29, as would have utility in multiple-arc welding operations. Also, it will be noted that the overhang of ends 43 permits remachining of the contact surfaces as they become worn.

Although the present invention has been described and illustrated in connection with preferred embodiments, it is of course to be understood that modifications and variations may be resorted to without departing from the spirit of this invention, as those skilled in this art will readily understand. For exampie, although the opposed roll means are disclosed as interconnected for conjoint rotation in opposite directions, one of the roll means can idle and be driven by the member 29, although this latter arrangement is not as suitable as the specifically disclosed arrangement as the forces applied to the member to be moved are thereby quite unbalanced and the member is placed in longitudinal shear. Also, each roll of a roll set can be continuously yieldably urged toward the other roll, as by the use of compression springs at each end of a roll set. Moreover, although the inclined surfaces are disclosed as straight, it will of course be appreciated that they can be arcuately concave or convex or otherwise non-planar provided only that they remain tapered. Naturally, however, a straight configuration for the inclined surfaces is much simpler and is preferred. Further by way of example, the rotation of the opposed roll means at equal angular velocities need not be maintained if the contact radii are altered accordingly, provided that the product of the angular velocity and the contact radius for one roll means remains equal to the product of the angular velocity and the contact radius for the other roll means; but of course such a modification needlessly greatly complicates the structure and operation of the device, so that rotation at equal angular velocities is greatly preferred. These and other modifications that will suggest themselves to persons skilled in this art are considered to be within the purview and scope of the present invention to the extent that they are comprehended within the spirit of the invention as defined by the appended claims.

What is claimed is:

1. Apparatus for moving a slender elongated member lengthwise, comprising a pair of opposed roll means rotatable about spaced shafts and adapted to receive a said elongated member between them, at least one of said roll means including a pair of coaxial rolls having portions defining peripheral tapered surfaces oppositely inclined radially inwardly toward each other, at least one roll of said pair of rolls being mounted for axial movement toward and away from the other roll of said pair of rolls to permit reception of various sizes of elongated members between said opposed roll means in contact with said tapered surfaces of both said rolls and with the periphery of the other said roll means, each said roll having a plurality of circumferentially spaced axially extending projections on its end adjacent the other roll, the projections of one roll interfingering between the projections of the other roll, the projections having outer surfaces comprising at least a portion of said tapered surfaces, and means for rotating at least one said roll means to move a said elongated member between said opposed roll means.

2. Apparatus as claimed in claim 1, and means continuously yieldably urging said at least one roll of said pair of rolls toward said other roll of said pair of rolls.

3. Apparatus for moving a slender elongated member lengthwise, comprising a pair of opposed roll sets rotatable about spaced parallel axes and adapted to receive a said elongated member between them, each of said roll sets including a pair of coaxial rolls having portions defining peripheral tapered surfaces oppositely inclined radially inwardly toward each other, at least one roll of each said pair of rolls being mounted for axial movement toward and away from the other roll of that pair of rolls to permit reception of various sizes of elongated members between said opposed roll sets in contact with said tapered surfaces of both rolls of each said pair of rolls, each said roll of both said pairs of rolls having a plurality of circumferentially spaced axially extending projections on its end adjacent the other roll of its pair, the projections of each roll of both said pairs of rolls interfingering between the projections of the other roll of its pair, the projections having outer surfaces comprising at least a portion of said tapered surfaces, and means for rotating at least one said roll set to move a said elongated member between said opposed roll sets.

4. Apparatus as claimed in claim 3, and means continuously yieldably urging said at least one roll of each said pair of rolls toward said other roll of each said pair of rolls.

5. Apparatus for moving a slender elongated member lengthwise, comprising a pair of opposed roll sets rotatable about spaced parallel axes and adapted to receive a said elongated member between them, one of said roll sets including a first roll and a second roll, said first and second rolls being coaxial, the other of said roll sets including a third roll and a fourth roll, said third and fourth rolls being coaxial, said first and third rolls being directly opposed to each other, said second and fourth rolls being directly opposed to each other, said first and fourth rolls being diagonally opposed to each other, said second and third rolls being diagonally opposed to each other, said first and second rolls having portions defining peripheral tapered surfaces oppositely inclined radially inwardly toward each other, said third and fourth rolls having portions defining peripheral tapered surfaces oppositely inclined radially inwardly toward each other, said first and second rolls having a plurality of circumferentially spaced axially extending projections on their ends adjacent each other, the projections of said first and second rolls interfingering between each other, said third and fourth rolls having a plurality of circumferentially spaced axially extending projections on their ends adjacent each other, the projections of said third and fourth rolls interfingering between each other, the projections having outer surfaces comprising at least a portion of said tapered surfaces, at least one of said first and second rolls being mounted for axial movement toward and away from the other of said first and second rolls and at least one of said third and fourth rolls being mounted for axial movement toward and away from the other of said third and fourth rolls, to permit reception of various sizes of elongated members between said opposed roll sets in contact with said tapered surfaces of each of said first, second, third and fourth rolls, and means for rotating at least one said roll set to move a said elongated member between said opposed roll sets.

6. Apparatus as claimed in claim 5, and means interconnecting said pair of opposed roll sets for rotation in opposite directions at equal angular velocities.

7. Apparatus as claimed in claim 6, said projections being spaced apart equal angular distances, the projections being so disposed that when a said projection on said first roll is disposed in the plane of and between said parallel axes as said projection on said fourth roll is also disposed in said plane and between said axes and when a said projection on said second roll is disposed in said plane and between said axes a said projection on said third roll is also disposed in said plane and between said axes.

8. Apparatus as claimed in claim 5, and means continuously yieldably urging said at least one of said first and second rolls axially toward the other and said at least one of said third and fourth rolls axially toward the other.

9. Apparatus as claimed in claim 5, the angles of opposite inclination of said tapered surfaces of said first and second rolls being equal, and the angles of opposite inclination of said tapered surfaces of said third and fourth rolls being equal.

10. Apparatus for moving lengthwise a slender elongated member of substantially circular cross-section, comprising a pair of first elements rotatable in spaced parallel circular orbits in opposite directions about spaced parallel axes and adapted to grasp the member between them at a pair of first points on opposite ends of a first diameter of said substantially circular cross-section, a pair of second elements spaced from said first elements and rotatable in spaced parallel circular orbits in opposite directions about the same said spaced parallel axes as said first elements and adapted to grasp the member between them at a pair of second points on opposite ends of a second diameter of said substantially circular cross-section, said first and second diameters being spaced apart lengthwise of the member and being disposed at a substantial angle to each other, at least one of said elements rotatable about each said axis being mounted for axial movement toward and away from the other said element rotatable about the same said axis to permit reception of various sizes of elongated members between and in contact with said elements, means continuously yieldably urging said at least one of said elements rotatable about each said axis axially relative to the other said element rotatable about the same said axis, and means for continuously rotating said pairs of elements thereby alternately to actuate said first and second elements to move the member lengthwise continuously in said one direction.

11. Apparatus as claimed in claim 10, said means continuously yieldably urging said at least one of said elements rotatable about each said axis axially relative to the other said element rotatable about the same said axis comprising at least one coil compression spring.

12. Apparatus as claimed in claim 11, said at least one coil compression spring being coaxial with said axis.

References Cited in the file of this patent

UNITED STATES PATENTS

| | | |
|---|---|---|
| 1,884,203 | Pickhard | Oct. 25, 1932 |
| 2,904,168 | Wall et al. | Sept. 15, 1959 |

FOREIGN PATENTS

| | | |
|---|---|---|
| 514,508 | Belgium | Oct. 15, 1952 |